Patented Nov. 14, 1933

1,934,896

UNITED STATES PATENT OFFICE 1,934,896

METHOD OF PRODUCING GASOLINE

Cary R. Wagner, Chicago, Ill., assignor to The Pure Oil Company, Chicago, Ill., a corporation of Ohio No Drawing. Application June 5, 1928
Serial No. 283,145

2 Claims. (Cl. 196—10)

This invention relates to an improved process of manufacturing gasoline-like hydrocarbons from unsaturated hydrocarbon gases, and has for its primary object the provision of a simple and improved process capable of ready and commercial application, adapted for the purpose of recovering in liquid form, fractions from unsaturated hydrocarbon gases which may be used as motor fuels.

In accordance with the present invention, a body of unsaturated hydrocarbon gases, obtained, for example, from vapor phase systems of oil conversion, are passed under relatively high pressures, varying between 600 to 1500 pounds per square inch, and at temperatures varying between 350 to 700° F., over a catalytic material. This catalytic material may be one of many, but I prefer to use metallic halides such as aluminum chloride, aluminum bromide, nickel chloride, iron chloride, zinc chloride, and titanium chloride. In addition I may use such materials as palladium sponge, platinum sponge, and finely divided alloys of these metals with other metals belonging to the eighth group of the periodic series. I may also employ with satisfactory results silica gel, activated charcoal, fuller's earth, death valley clay, bentonite, and similar partially hydrated silicates and silicic acid compounds. These catalysts, comprising the three general groups set forth, may be used singly or independently of each other or in various combinations, as desired.

In this operation the unsaturated hydrocarbons, such as ethylene, $C_2H_4$, propylene $C_3H_6$, and butylene $C_4H_8$, which have what is known as a double bond, are capable of reacting chemically with the halogens to form additive compounds. These compounds, when properly treated under the temperature and pressure conditions set forth, will react with each other to form additive compounds of higher molecular weights. Through regulated conditions these compounds can be kept at such molecular weights as to render them suitable particularly for use as motor fuels.

What is claimed is:

1. The continuous process of producing gasoline-like hydrocarbons of relatively higher molecular weight from those of lower molecular weight, which consists in passing unsaturated hydrocarbon gases of the ethylene series including ethylene, propylene and butylene over a catalyzing agent consisting of a metallic halide while said gases are maintained at a temperature of between 350° F. to 700° F. and at a pressure of between 600 to 1500 pounds per square inch, said metallic halide being selected from any one of a group consisting of the following compounds: aluminum chloride, aluminum bromide, nickel chloride, iron chloride, and titanium chloride.

2. The continuous process of producing gasoline-like hydrocarbons of relatively higher molecular weight from those of lower molecular weight, which consists in passing unsaturated hydrocarbon gases obtained from vapor phase systems of oil conversion over a catalyzing agent consisting of a metallic halide while said gases are maintained at a temperature of between 350° F. to 700° F. and at a pressure of between 600 to 1500 pounds per square inch, said metallic halide being selected from any one of a group consisting of the following compounds: aluminum chloride, aluminum bromide, nickel chloride, iron chloride, and titanium chloride.

CARY R. WAGNER.